United States Patent
Gordon et al.

(10) Patent No.: US 10,061,725 B2
(45) Date of Patent: Aug. 28, 2018

(54) SCANNING MEMORY FOR DE-DUPLICATION USING RDMA

(71) Applicant: Strato Scale Ltd., Herzlia (IL)

(72) Inventors: Abel Gordon, Haifa (IL); Muli Ben-Yehuda, Haifa (IL); Benoit Guillaume Charles Hudzia, Belfast (GB); Etay Bogner, Tel Aviv (IL)

(73) Assignee: Strato Scale Ltd., Herzlia (IL)

( * ) Notice: Subject to any disclaimer, the term of this patent is extended or adjusted under 35 U.S.C. 154(b) by 0 days.

(21) Appl. No.: 15/424,912

(22) Filed: Feb. 6, 2017

(65) Prior Publication Data

US 2017/0147518 A1   May 25, 2017

Related U.S. Application Data

(63) Continuation-in-part of application No. 14/543,920, filed on Nov. 18, 2014.

(60) Provisional application No. 61/974,489, filed on Apr. 3, 2014.

(51) Int. Cl.

| | |
|---|---|
| *G06F 12/00* | (2006.01) |
| *G06F 13/28* | (2006.01) |
| *G06F 3/06* | (2006.01) |
| *G06F 13/42* | (2006.01) |
| *G06F 13/40* | (2006.01) |

(52) U.S. Cl.
CPC .............. *G06F 13/28* (2013.01); *G06F 3/067* (2013.01); *G06F 3/0608* (2013.01); *G06F 3/0641* (2013.01); *G06F 3/0647* (2013.01); *G06F 13/4068* (2013.01); *G06F 13/42* (2013.01)

(58) Field of Classification Search
CPC combination set(s) only.
See application file for complete search history.

(56) References Cited

U.S. PATENT DOCUMENTS

| | | |
|---|---|---|
| 8,656,386 B1 | 2/2014 | Baimetov et al. |
| 8,671,445 B1 | 3/2014 | Wang et al. |
| 9,330,015 B2 | 5/2016 | Baskakov et al. |
| 9,552,435 B2 | 1/2017 | Wu et al. |
| 9,565,651 B2 | 2/2017 | Julian et al. |
| 2006/0053139 A1 | 3/2006 | Marzinski et al. |
| 2006/0059242 A1 | 3/2006 | Blackmore et al. |
| 2006/0059282 A1 | 3/2006 | Chaudhary et al. |
| 2006/0155674 A1 | 7/2006 | Traut et al. |
| 2006/0155946 A1 | 7/2006 | Ji et al. |
| 2009/0049259 A1 | 2/2009 | Sudhakar et al. |

(Continued)

OTHER PUBLICATIONS

U.S. Appl. No. 14/672,466 Office Action dated Jan. 30, 2017.

(Continued)

*Primary Examiner* — Midys Rojas
(74) *Attorney, Agent, or Firm* — D. Kligler IP Services Ltd.

(57) ABSTRACT

A method for storage includes storing multiple memory pages in a memory of a first compute node. Using a second compute node that communicates with the first compute node over a communication network, duplicate memory pages are identified among the memory pages stored in the memory of the first compute node by directly accessing the memory of the first compute node. One or more of the identified duplicate memory pages are evicted from the first compute node. The identification of duplicate pages is performed by a node selected responsive to available processing or bandwidth resources.

20 Claims, 3 Drawing Sheets

(56) References Cited

U.S. PATENT DOCUMENTS

| | | | |
|---|---|---|---|
| 2009/0055447 | A1 | 2/2009 | Sudhakar et al. |
| 2012/0030406 | A1 | 2/2012 | Chang et al. |
| 2012/0124282 | A1 | 5/2012 | Frank et al. |
| 2012/0246386 | A1 | 9/2012 | Akutsu et al. |
| 2012/0317331 | A1 | 12/2012 | Broas |
| 2013/0024645 | A1 | 1/2013 | Cheriton et al. |
| 2013/0132696 | A1 | 5/2013 | Tomida et al. |
| 2013/0339568 | A1 | 12/2013 | Corrie |
| 2014/0114932 | A1 | 4/2014 | Mallaiah et al. |
| 2014/0258655 | A1 | 9/2014 | Park et al. |
| 2014/0359244 | A1* | 12/2014 | Chambliss ........ G06F 17/30156 711/170 |
| 2016/0117103 | A1* | 4/2016 | Gallant ................... G06F 7/24 711/114 |
| 2016/0378355 | A1* | 12/2016 | Muthukkaruppan ........................ G06F 3/0641 711/136 |
| 2017/0031779 | A1 | 2/2017 | Helliker et al. |

OTHER PUBLICATIONS

U.S. Appl. No. 14/594,188 Office Action dated Apr. 5, 2017.
U.S. Appl. No. 15/017,687 office action dated Aug. 8, 2017.
European Application # 14882215.8 Search Report dated Aug. 1, 2017.
Newhall et al., "Reliable Adaptable Network RAM", IEEE International Conference on Cluster Computing, pp. 2-12, Sep. 29, 2008.
Newhall et al., "Nswap: A Network Swapping Module for Linux Clusters", European Conference on Parallel Processing, Part of the Lecture Notes in Computer Science book series (LNCS, vol. 2790), pp. 1160-1169, May 29, 2004.
Dramitinos et al., "Adaptive and Reliable Paging to Remote Main Memory", Journal of Parallel and Distributed Computing, vol. 58, Issue 3, pp. 357-388, Sep. 1, 1999.
Deshpande et al., "MemX: Virtualization of Cluster-Wide Memory", 39th IEEE International Conference on Parallel Processing (ICPP), pp. 663-672, Sep. 13, 2010.
U.S. Appl. No. 14/181,791 office action dated Jun. 28, 2017.
U.S. Appl. No. 14/538,848 office action dated Oct. 6, 2017.
European Application # 16754814.8 Search Report dated Oct. 24, 2017.
European Application # 15772850.2 Search Report dated Jan. 5, 2018.

* cited by examiner

SCANNING MEMORY FOR DE-DUPLICATION USING RDMA

CROSS-REFERENCE TO RELATED APPLICATIONS

This application is a continuation in part of U.S. patent application Ser. No. 14/543,920, filed Nov. 18, 2014, which claims the benefit of U.S. Provisional Patent Application 61/974,489, filed Apr. 3, 2014, whose disclosure is incorporated herein by reference.

FIELD OF THE INVENTION

The present invention relates generally to computing systems, and particularly to methods and systems for resource sharing among compute nodes.

BACKGROUND OF THE INVENTION

Machine virtualization is commonly used in various computing environments, such as in data centers and cloud computing. Various virtualization solutions are known in the art. For example, VMware, Inc. (Palo Alto, Calif.), offers virtualization software for environments such as data centers, cloud computing, personal desktop and mobile computing.

In some computing environments, a compute node may access the memory of other compute nodes directly, using Remote Direct Memory Access (RDMA) techniques. A RDMA protocol (RDMAP) is specified, for example, by the Network Working Group of the Internet Engineering Task Force (IETF®), in "A Remote Direct Memory Access Protocol Specification," Request for Comments (RFC) 5040, October, 2007, which is incorporated herein by reference. A RDMA enabled Network Interface Card (NIC) is described, for example, in "RDMA Protocol Verbs Specification," version 1.0, April, 2003, which is incorporated herein by reference.

SUMMARY OF THE INVENTION

An embodiment of the present invention that is described herein provides a method for storage, including storing multiple memory pages in a memory of a first compute node. Using a second compute node that communicates with the first compute node over a communication network, duplicate memory pages are identified among the memory pages stored in the memory of the first compute node by directly accessing the memory of the first compute node. One or more of the identified duplicate memory pages are evicted from the first compute node. In an embodiment, directly accessing the memory of the first compute node includes accessing the memory of the first compute node using a Remote Direct Memory Access (RDMA) protocol.

In some embodiments, evicting the duplicate memory pages includes de-duplicating one or more of the duplicate memory pages, or transferring one or more of the duplicate memory pages from the first compute node to another compute node. In other embodiments, the method includes calculating respective hash values over the memory pages, and identifying the duplicate memory pages includes reading the hash values directly from the memory of the first compute node and identifying the memory pages that have identical hash values. In yet other embodiments, calculating the hash values includes generating the hash values using hardware in a Network Interface Card (NIC) that connects the first compute node to the communication network.

In an embodiment, calculating the hash values includes pre-calculating the hash values in the first compute node and storing the pre-calculated hash values in association with respective memory pages in the first compute node, and reading the hash values includes reading the pre-calculated hash values directly from the memory of the first compute node. In another embodiment, calculating the hash values includes reading, directly from the memory of the first compute node, contents of the respective memory pages, and calculating the hash values over the contents of the respective memory pages in the second compute node.

In some embodiments, evicting the duplicate memory pages includes providing to the first compute node eviction information of candidate memory pages that indicates which of the memory pages in the first compute node are candidates for eviction. In other embodiments, evicting the duplicate memory pages includes re-calculating hash values of the candidate memory pages, and refraining from evicting memory pages that have changed since scanned by the second compute node. In yet other embodiments, evicting the duplicate memory pages includes applying to at least the candidate memory pages copy-on-write protection, so that for a given candidate memory page that has changed, the first compute node stores a respective modified version of the given candidate memory page in a location different from the location of the given candidate memory page, and evicting the candidate memory pages regardless of whether the candidate memory pages have changed.

In an embodiment, the method includes storing the eviction information in one or more compute nodes, and accessing the eviction information directly in respective memories of the one or more compute nodes. In another embodiment, evicting the duplicate memory pages includes receiving from the first compute node a response report of the memory pages that were actually evicted, and updating the eviction information in accordance with the response report. In yet another embodiment, the method includes sharing the response report directly between the memories of the first compute node and the second compute node.

In some embodiments evicting the duplicate memory pages includes sharing information regarding page usage statistics in the first compute node, and deciding on candidate memory pages for eviction based on the page usage statistics. In other embodiments, the method includes maintaining accessing information to the evicted memory pages in the second compute node, and allowing the first compute node to access the evicted memory pages by reading the accessing information directly from the memory of the second compute node.

There is additionally provided, in accordance with an embodiment of the present invention, apparatus including first and second compute nodes. The first compute node includes a memory and is configured to store in the memory multiple memory pages. The second compute node is configured to communicate with the first compute node over a communication network, to identify duplicate memory pages among the memory pages stored in the memory of the first compute node by accessing the memory of the first compute node directly, and to notify the first compute node of the identified duplicate memory pages, so as to cause the first compute node to evict one or more of the identified duplicate memory pages from the first compute node.

There is additionally provided, in accordance with an embodiment of the present invention, a computer software product, including a non-transitory computer-readable medium in which program instructions are stored, which instructions, when read by a processor of a second compute node that communicates over a communication network with a first compute node that stores multiple memory pages, cause the processor to identify duplicate memory pages among the memory pages stored in the memory of the first compute node, by accessing the memory of the first compute node directly, and, to notify the first compute node to evict one or more of the identified duplicate memory pages from the first compute node.

There is further provided in accordance with an embodiment of the present invention, a method for storage, comprising storing multiple memory pages in a memory of a first computer node, in a system of multiple computer nodes connected by a communication network, determining available processing or bandwidth resources of the system, scheduling a second computer node in the system to perform de-duplication tasks for the memory of the first computer node, responsive to the determined available processing or bandwidth resources, identifying duplicate memory pages among the memory pages stored in the memory of the first computer node, by the second computer node, by directly accessing the memory of the first computer node, and evicting one or more of the identified duplicate memory pages from the first computer node.

Optionally, directly accessing the memory of the first computer node comprises accessing the memory of the first computer node using a Remote Direct Memory Access (RDMA) protocol. Optionally, evicting the duplicate memory pages comprises de-duplicating one or more of the duplicate memory pages, or transferring one or more of the duplicate memory pages from the first computer node to another computer node. The method optionally includes calculating respective hash values over the memory pages, wherein identifying the duplicate memory pages comprises reading the hash values directly from the memory of the first computer node and identifying the memory pages that have identical hash values. Optionally, calculating the hash values comprises generating the hash values using hardware in a Network Interface Card (NIC) that connects the first computer node to the communication network.

Optionally, scheduling the second computer node comprises scheduling the second computer node when the first computer node is determined to be loaded above a threshold value. Optionally, scheduling the second computer node comprises scheduling a computer node currently having free available processing resources.

Optionally, scheduling the second computer node comprises scheduling a computer node currently having most available processing resources in the system.

Optionally, scheduling the second computer node comprises calculating a cost function of de-duplication tasks of the memory of the first node for a plurality of nodes of the system and scheduling a node with a lowest calculated score. Optionally, the method includes calculating a benefit score for de-duplication of the first node and scheduling a node to perform de-duplication tasks for the first node, only if the cost score of the scheduled node is lower than the benefit score.

Optionally, scheduling the second computer node comprises scheduling computer nodes to perform de-duplication tasks for the respective memories of a plurality of the nodes. Optionally, the method includes scheduling computer nodes to perform de-duplication tasks for respective memories of a plurality of the nodes. Optionally, the method includes scheduling a plurality of computer nodes to perform concurrently de-duplication tasks on other nodes. Optionally, the method includes maintaining accessing information to the evicted memory pages in the second computer node, and allowing the first computer node to access the evicted memory pages by reading the accessing information directly from the memory of the second computer node.

There is further provided in accordance with an embodiment of the present invention, a multiple computer node system, comprising a plurality of computer nodes, which comprise one or more processing resources and a memory; and a communication network connecting the plurality of computer nodes. The plurality of computer nodes are configured to perform de-duplication tasks on other computer nodes, over the communication network, and at least one of the computer nodes is configured to determine available processing or bandwidth resources of the computer nodes and to schedule one or more of the computer nodes to perform de-duplication tasks on the memory of the nodes responsive to the determined available processing or bandwidth resources, such that at some times, at least one first computer node has its de-duplication performed by a second computer node, over the communication network.

Optionally, the at least one of the computer nodes is configured to schedule a second computer node to perform de-duplication for a first computer node only when the currently available processing resources of the first computer node are below a threshold.

Optionally, the at least one of the computer nodes is configured to schedule a second computer node, determined to have the most available processing resources among the plurality of computer nodes to perform de-duplication for the first computer node.

Optionally, the at least one of the computer nodes is configured to calculate a cost function of de-duplication tasks of the memory of the first node for a plurality of nodes of the system and to schedule a second computer node with a lowest calculated score.

Optionally, the at least one of the computer nodes is configured to calculate a benefit score for de-duplication of the first node and to schedule a node to perform de-duplication tasks for the first node, only if the cost score of the scheduled node is lower than the benefit score. Optionally, the at least one of the computer nodes is configured to repeat the scheduling at least once an hour, based on current determined available processing or bandwidth resources.

The present invention will be more fully understood from the following detailed description of the embodiments thereof, taken together with the drawings in which:

DETAILED DESCRIPTION OF EMBODIMENTS

Overview

Figure 1:
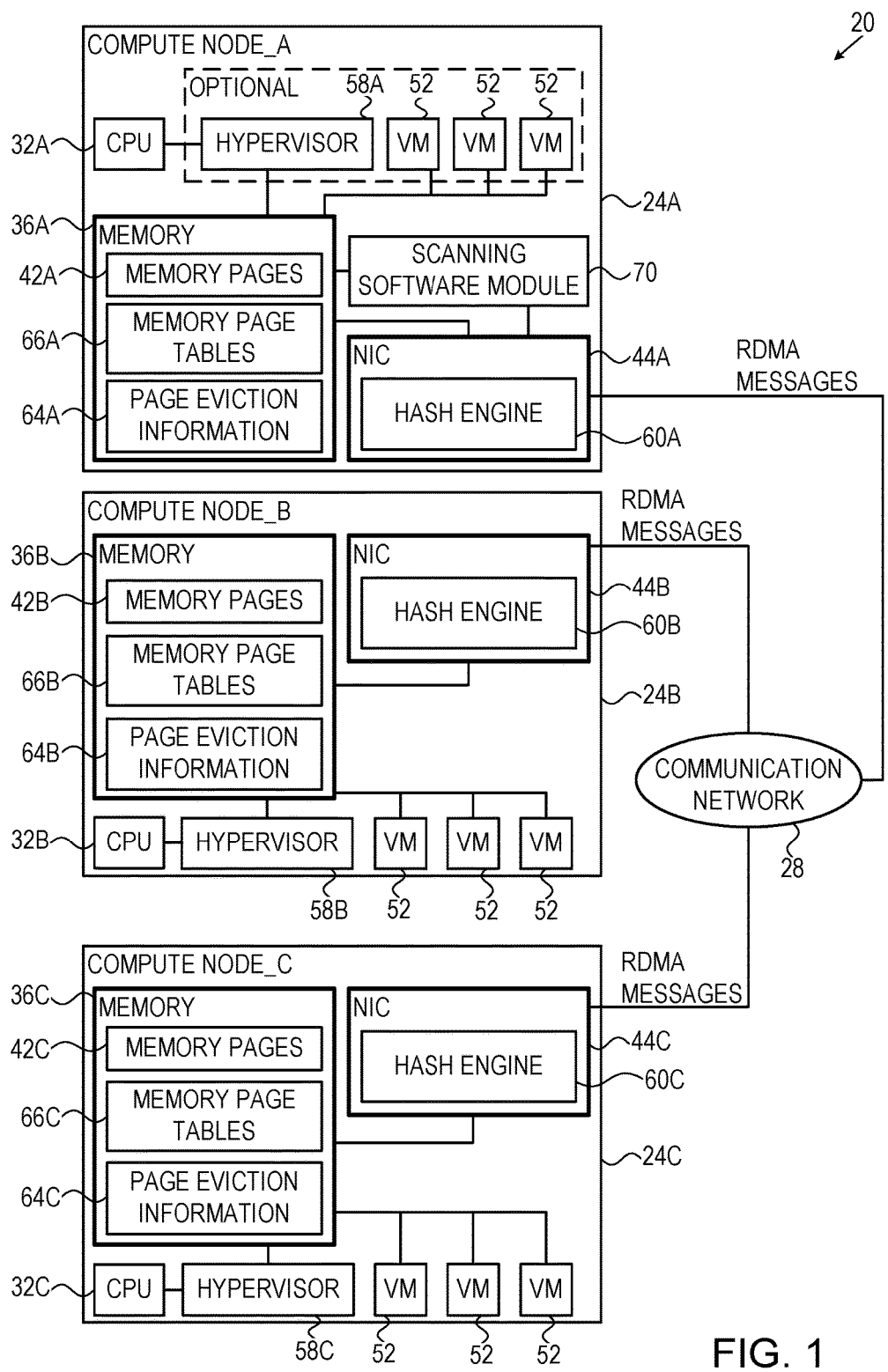
FIG. 1 is a block diagram that schematically illustrates a computing system, in accordance with an embodiment of the present invention.

Various computing systems, such as data centers, cloud computing systems and High-Performance Computing (HPC) systems, run Virtual Machines (VMs) over a cluster of compute nodes connected by a communication network. Compute nodes are also referred to simply as "nodes" for brevity. In many practical cases, the major bottleneck that limits VM performance is lack of available memory. For example, limited memory resources may limit the number of VMs that compute nodes can host concurrently. One possible way of increasing the available memory is de-duplication of duplicate memory pages.

Embodiments of the present invention that are described herein provide improved methods and systems for memory page de-duplication. In the description that follows we assume a basic storage unit referred to as a memory page, although the disclosed techniques are suitable for other kinds of basic storage units. The methods and systems described herein enable a given compute node to scan for duplicate memory pages on another node, or even across an entire node cluster, using direct memory access techniques.

In the context of the present invention and in the claims, terms such as "direct access to a memory of a compute node" and "reading directly from the memory of a compute node" mean a kind of memory access that does not load or otherwise involve the CPU of that node. In some embodiments, an example protocol that performs direct memory accessing comprises the RDMA protocol that is implemented, for example, on the NIC of the compute node, e.g., as a set of RDMA protocol primitives. Although we mainly refer to RDMA as a direct accessing protocol, any other suitable method for directly accessing a remote memory can also be used.

One major cause for inefficient usage of memory resources is storage of duplicate copies of certain memory pages within individual compute nodes and/or across the node cluster. For example, multiple VMs running in one or more compute nodes may execute duplicate instances of a common program such as, for example, an Operating System (OS). Several techniques for improving memory utilization by configuring one node to scan, using RDMA, the memory pages of another node while searching for duplicate memory pages to be merged, will be described in detail below.

One way of performing de-duplication is to perform two phases. First, duplicate memory pages should be identified, and then at least some of the duplicate pages should be discarded or otherwise handled. Typically, a hypervisor in the node allocates CPU resources both to the VMs and to the de-duplication process. Since the identification of duplicate memory pages requires considerable amount of CPU resources, a node whose CPU is busy (e.g., running VMs) may not have sufficient CPU resources for memory de-duplication. As a result, mitigating duplicate memory pages in this node may be poor or delayed. Identifying duplicate memory pages by the local CPU additionally tends to degrade the VM performance because of loading the scanned memory pages into the CPU cache (also referred to as cache pollution effects).

In the disclosed techniques, the task of scanning the memory pages of a given compute node in search for duplicate memory pages is delegated to some other node, typically a node that has free CPU resources. The node performing the scanning is also referred to herein as a remote node, and the nodes whose memory pages are being remotely scanned are also referred to herein as local nodes. As a result of this task delegation, efficient de-duplication can be achieved even on very busy nodes. The scanning process is typically performed using RDMA, i.e., by accessing the memory of the scanned node directly without involving the CPU of the scanned node. As a result, the scanned node is effectively offloaded of the duplicate page scanning task.

The scanning node may search for duplicate memory pages on a single scanned node or over multiple scanned nodes. By scanning memory pages in multiple scanned nodes rather than individually per node, duplicate memory pages that reside in different nodes can be identified and handled, thus improving memory utilization cluster-wide.

Partitioning of the de-duplication task between a local node and a remote node incurs some communication overhead between the nodes. In order to reduce this overhead, in some embodiments the local node transfers hash values of the scanned memory pages to the remote node rather than the (much larger) contents of the memory pages. In some embodiments, calculation of the hash values is performed when storing the memory pages, or on-the-fly using hardware in the local node's NIC. This feature offloads the CPU of the local node from calculating the hash values.

In some embodiments, as part of the scanning process, the remote node generates eviction information that identifies memory pages to be evicted from the local node. The remote node then informs the local node of the memory pages to be evicted.

The local node may evict a local memory page in various ways. For example, if a sufficient number of copies of the page exist cluster-wide or at least locally in the node, the page may be deleted from the local node.

This process of page removal is referred to as de-duplication. If the number of copies of the page does not permit de-duplication, the page may be exported to another node, e.g., to a node in which the memory pressure is lower. Alternatively, a duplicate page may already exist on another node, and therefore the node may delete the page locally and maintain accessing information to the remote duplicate page. The latter process of deleting a local page that was exported (or that already has a remote duplicate) is referred to as remote swap. In the context of the present patent application and in the claims, the term "eviction" of a memory page refers to de-duplication, remote swapping (depending on whether the memory page to be deleted locally has a local or remote duplicate, respectively), or any other way of mitigating a duplicate memory page.

In an embodiment, a local node that receives from the remote node eviction information, applies to the memory pages to be evicted de-duplication or remote swapping based, for example, on access patterns to the memory pages. The local node then reports to the remote node which of the memory pages were actually evicted (e.g., memory pages that have changed since delivered to the remote node should not be evicted), and the remote node updates the eviction information accordingly. In an embodiment, when a local node accesses a memory page that has been previously evicted, the local node first accesses the eviction information in the remote node using RDMA.

The nodes in the cluster can be configured to use RDMA for sharing memory resources in various ways. For example, in an embodiment, the remote node stores part or all of the eviction information in one or more other nodes. In such embodiments, when not available locally, the remote and local nodes access the eviction information using RDMA.

As another example, the task of scanning memory pages for identifying duplicate memory pages can be carried out by a group of two or more nodes. In such embodiments, each of the nodes in the group scans memory pages in other nodes (possibly including other member nodes in the group) using RDMA. As yet another example, a node can share local information such as page access patterns with other nodes by allowing access to this information using RDMA.

An aspect of some embodiments of the invention relates to a multi-node computing system in which a de-duplication scheduler dynamically determines for each node whether it will undergo de-duplication and which node, and/or processing unit of which node, will perform the de-duplication. The de-duplication scheduler receives information on the current load on some or all of the nodes of the multi-node computing system and/or information on the current bandwidth utilization of communication links between the nodes and accordingly assigns de-duplication tasks.

System Description

FIG. 1 is a block diagram that schematically illustrates a computing system 20, which comprises a cluster of compute nodes 24 in accordance with an embodiment of the present invention. System 20 may comprise, for example, a data center, a cloud computing system, a High-Performance Computing (HPC) system, a storage system or any other suitable system.

Compute nodes 24 (referred to simply as "nodes" for brevity) typically comprise servers, but may alternatively comprise any other suitable type of compute nodes. The node-cluster in FIG. 1 comprises three compute nodes 24A, 24B and 24C. Alternatively, system 20 may comprise any other suitable number of nodes 24, either of the same type or of different types. In some embodiments, compute nodes 24 are mounted together in a multi-node rack.

Nodes 24 are connected by a communication network 28 serving for intra-cluster communication, typically a Local Area Network (LAN). Network 28 may operate in accordance with any suitable network protocol, such as Ethernet or InfiniBand.

Each node 24 comprises a Central Processing Unit (CPU) 32. Depending on the type of compute node, CPU 32 may comprise multiple processing cores and/or multiple Integrated Circuits (ICs). Regardless of the specific node configuration, the processing circuitry of the node as a whole is regarded herein as the node CPU. Each node further comprises a memory 36 (typically a volatile memory such as Dynamic Random Access Memory—DRAM) that stores multiple memory pages 42, and a Network Interface Card (NIC) 44 for communicating with other compute nodes over communication network 28. In InfiniBand terminology, NIC 44 is also referred to as a Host Channel Adapter (HCA).

Nodes 24B and 24C (and possibly node 24A) typically run Virtual Machines (VMs) 52 that in turn run customer applications. A hypervisor 58 manages the provision of computing resources such as CPU time, Input/Output (I/O) bandwidth and memory resources to VMs 52. Among other tasks, hypervisor 58 enables VMs 52 to access memory pages 42 that reside locally and in other compute nodes. In some embodiments, hypervisor 58 additionally manages the sharing of memory resources among compute nodes 24.

In the description that follows we assume that NIC comprises a RDMA enabled network adapter. In other words, NIC 44 implements a RDMA protocol, e.g., as a set of RDMA protocol primitives (as described, for example, in "RDMA Protocol Verbs Specification," cited above). Using RDMA enables one node (e.g., node 24A in the present example) to access (e.g., read, write or both) memory pages 42 stored in another node (e.g., 42B and 42C) directly, without involving the CPU or Operating System (OS) running on the other node.

In some embodiments, a hash value computed over the content of a memory page is used as a unique identifier that identifies the memory page (and its identical copies) cluster-wide. The hash value is also referred to as Global Unique Content ID (GUCID). Note that hashing is just an example form of signature or index that may be used for indexing the page content. Alternatively or additionally, any other suitable signature or indexing scheme can be used. For example, in some embodiments, memory pages are identified as non-duplicates when respective Cyclic Redundancy Codes (CRCs) calculated over the memory pages are found to be different.

NIC 44 comprises a hash engine 60 that may be configured to compute hash values of memory pages that NIC 44 accesses. In some embodiments, hash engine 60 computes the hash value over the content of the memory page to be used for identifying duplicate memory pages. Alternatively, for fast rejection of non-matching memory pages, hash engine 60 first calculates a CRC or some other checksum that can be derived quickly (but is too weak for unique page identification), and computes the hash value, only when the CRC of the memory pages match.

In addition to storing memory pages 42, memory 36 stores eviction information 64 that includes information for carrying out the page eviction process (i.e., de-duplication and remote swapping) and enables compute nodes 24 to access memory pages that have been previously evicted. Memory 36 additionally stores memory page tables 66 that hold access information to evicted pages. Tables are updated following de-duplication or remote swapping. Memory page tables 66 and eviction information 64 may include metadata of memory pages such as, for example, the storage location of the memory page and a hash value computed over the memory page content. In some embodiments, eviction information 64 and memory page tables 66 are implemented as a unified data structure.

In some embodiments, a given compute node is configured to search for duplicate memory pages in other compute nodes in the cluster. The description that follows includes an example, in which node 24A scans the memory pages 42B and 42C of nodes 24B and 24C, respectively. In our terminology, node 24A serves as a remote node, whereas nodes 24B and 24C serve as local nodes. Node 24A typically executes a scanning software module 70 to perform page scanning in other nodes and to manage the selection of candidate memory pages for eviction. The execution of scanning software module 70 may depend on the hardware configuration of node 24A. For example, in one embodiment, node 24A comprises a hypervisor 58A and one or more VMs 52, and either the hypervisor or one of the VMs executes scanning software 70. In another embodiment, CPU 32A executes scanning software 70. In yet other embodiments, node 24A comprises a hardware accelerator unit (not shown in the figure) that executes scanning software 70.

In some embodiments, instead of delivering the content of the scanned memory pages, NICs 44B and 44C compute the hash values of the scanned memory pages on the fly, using hash engine 60, and deliver the hash values (rather than the content of the memory pages) to NIC 44A, which stores the hash values in memory 36A. This feature reduces the communication bandwidth over network considerably, because the size of a memory page is typically much larger than the size of its respective hash value. Additionally, this feature offloads the CPUs of the remote and local nodes from calculating the hash values.

In alternative embodiments, instead of, or in combination with NICs 44B and 44C, CPUs 32B and 32C or other modules in nodes 24B and 24C compute the hash values of the memory pages. Further alternatively, the hash values may be calculated and stored in association with the respective memory pages (e.g., when the memory pages are initially stored), and retrieved when scanning the memory pages. Thus, when node 24A scans memory pages 42B and 42C, instead of calculating the hash values on the fly, node 24A reads, using RDMA, the hash values that were pre-calculated and stored by the local nodes.

Calculating hash values on the fly using hash engines (e.g., 60B and 60C) frees CPUs 32 from calculating these hash values, thus improving the utilization of CPU resources. In alternative embodiments, NICs 44B and 44C deliver the content of memory pages 42B and 44C to NIC 44A, which computes the respective hash values prior to storing in memory 36A.

Scanning software module 70 in node 24A analyses the hash values retrieved from nodes 24B and 24C and generates respective eviction information 64A, which includes accessing information to memory pages 42B and 42C to be evicted. Following the eviction, nodes 24B and 24C read eviction information 64A to retrieve accessing information to memory pages 42B and 42C that were previously evicted. Nodes 42B and 24C additionally update their respective page memory tables 66.

In some embodiments, node 24A comprises a hardware accelerator, such as for example, a cryptographic or compression accelerator (not shown in the figure). In such embodiments, the accelerator can be used, instead of or in addition to CPU 32A, for scanning memory pages 42B and 42C, e.g., by executing scanning software module 70. Alternatively, any other suitable hardware accelerator can be used.

Further aspects of resource sharing for VMs over a cluster of compute nodes are addressed in U.S. Patent publications 2015/0234669 and 2015/0312366, which are assigned to the assignee of the present patent application and whose disclosures are incorporated herein by reference.

The system and compute-node configurations shown in FIG. 1 are example configurations that are chosen purely for the sake of conceptual clarity. In alternative embodiments, any other suitable system and/or node configuration can be used. The various elements of system 20, and in particular the elements of nodes 24, may be implemented using hardware/firmware, such as in one or more Application-Specific Integrated Circuit (ASICs) or Field-Programmable Gate Array (FPGAs). Alternatively, some system or node elements, e.g., CPUs 32, may be implemented in software or using a combination of hardware/firmware and software elements.

In some embodiments, CPUs 32 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

In FIG. 1 above, compute nodes 24 communicate with one another using NIC devices that are capable of communicating over the network and accessing the memory of other compute nodes directly, e.g., using RDMA. In alternative embodiments, other devices that enable compute nodes to communicate with one another regardless of the underlying communication medium, and/or using direct accessing protocols other than RDMA, can also be used. Examples of such devices include RDMA-capable NICs, non-RDMA capable Ethernet NICs and InfiniBand HCAs.

In some embodiments, the communication occurs between a host that accesses the memory of another host in the same sever. In such embodiments, the direct memory access can be done using any suitable bus-mastering device that performs direct memory accessing, such as devices that communicate over a "PCIe network" or over any other suitable proprietary or other bus types.

In some embodiments, the communication scheme between compute nodes comprises both communication devices (e.g., NICs) and memory access devices, e.g., devices that access the memory using a PCIe network.

The hardware implementing the communication device, the direct memory access device or both, can comprise, for example, an RDMA-capable NIC, an FPGA, or a General-purpose computing on Graphics Processing Unit (GPGPU).

Figure 2:
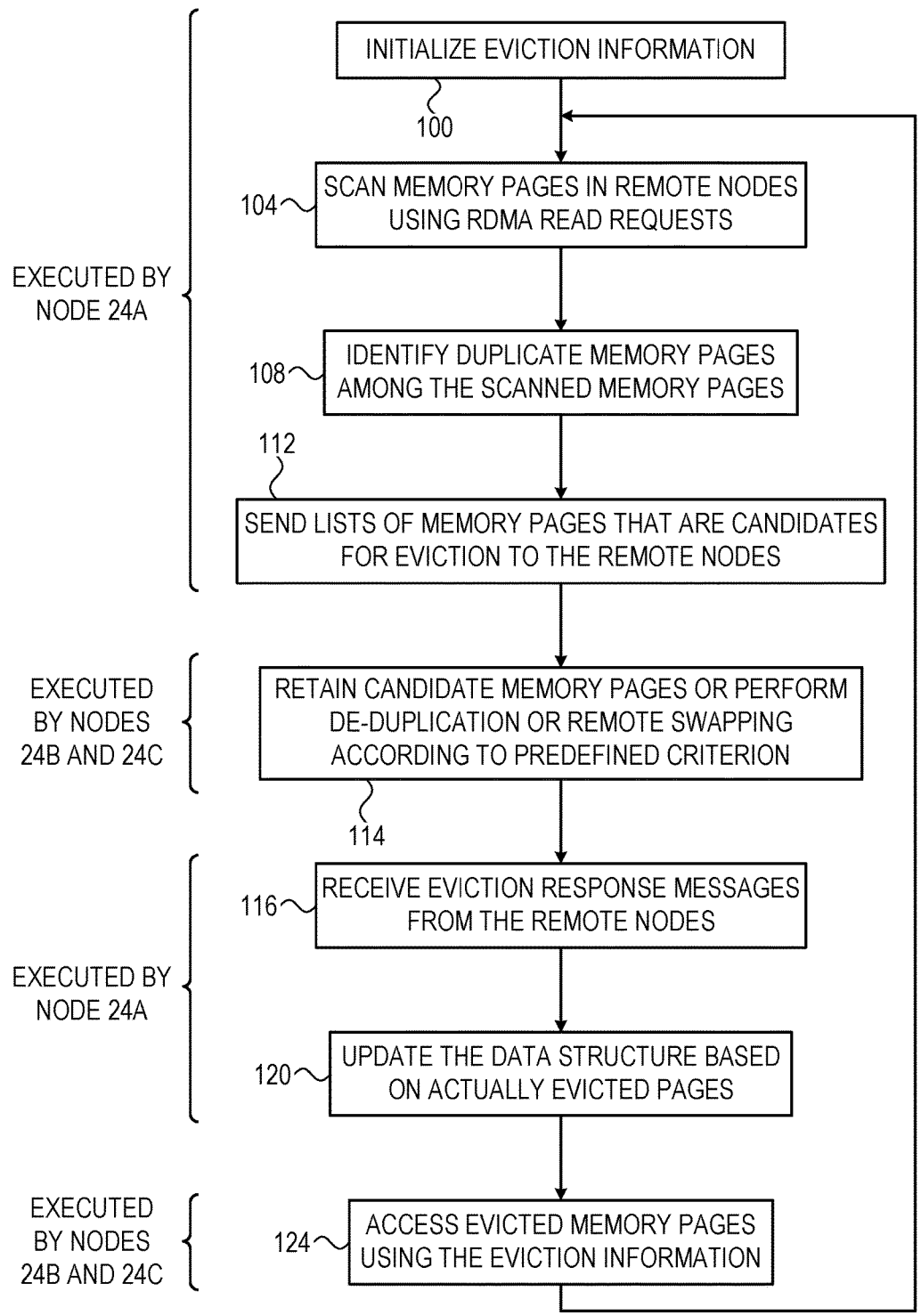
FIG. 2 is a flow chart that schematically illustrates a method for de-duplicating memory pages, including scanning for duplicate memory pages in other compute nodes using RDMA, in accordance with an embodiment of the present invention.

Identifying Duplicate Memory Pages by Scanning Memory Pages in Remote Nodes using RDMA FIG. 2 is a flow chart that schematically illustrates a method for de-duplicating memory pages, including scanning for duplicate memory pages in other compute nodes using RDMA, in accordance with an embodiment of the present invention. In the present example, and with reference to system 20 described in FIG. 1 above, compute node 24A manages the eviction of duplicates among memory pages 42B and 42C. The duplicate memory pages may include local pages among memory pages 42A. In alternative embodiments, system 20 may comprise any suitable number of compute nodes (other than three), of which any suitable subgroup of compute nodes are configured to de-duplicate memory pages cluster-wide.

In an embodiment, parts related to scanning software module 70 are executed by node 24A and other parts by nodes 24B and 24C. In the present example, node 24A comprises a hypervisor 58A, which executes the method parts that are related to scanning software module 70. Alternatively, another element of node 24A, such as CPU 32A or a hardware accelerator can execute scanning software module 70.

The method begins at an initializing step 100, by hypervisor 58A initializing eviction information 64A. In some embodiments, hypervisor 58A initializes eviction information 64A to an empty data structure. Alternatively, hypervisor 58A scans local memory pages 24A, identifies duplicates among the scanned memory pages (e.g., using the methods that will be described below), and initializes eviction information 64A accordingly.

At a scanning step 104, hypervisor 58A scans memory pages 42B and 42C using RDMA. To scan the memory pages, hypervisor 58A reads the content of memory pages 42B and 42C or hash values thereof into memory 36A, as described herein. In some embodiments, NICs 44B and 44C are configured to compute (e.g., using hash engines 60B and 60C, respectively) hash values of respective memory pages 42B and 42C (i.e., without involving CPUs 32B and 32C), and to deliver the computed hash values to memory 36A via NIC 44A. Alternatively, the hash values can be pre-calculated and stored by the local nodes, as described above.

Further alternatively, NICs 44B and 44C retrieve the content of respective memory pages 42B and 42C using RDMA and deliver the content of the retrieved memory pages to memory 36A. In an embodiment, when receiving the content of memory pages 42B and 42C, NIC 44A computes the respective hash values of the memory pages and stores the hash values in memory 36A.

At a clustering step 108, by analyzing the retrieved hash values in memory 36A, hypervisor 58A identifies candidate memory pages for eviction. In other words, hypervisor 58A classifies memory pages 42B and 42C corresponding to identical hash values as duplicate memory pages. In embodiments in which at step 104 memory 36A stores the retrieved content of memory pages 42B and 42C, hypervisor 58A identifies duplicate memory pages by comparing the content of the memory pages. In some embodiments, the identification of duplicates by hypervisor 58A includes memory pages 24A.

At a sending step 112, hypervisor 58A sends to each of hypervisors 58B and 58C a respective list of candidate memory pages for eviction. Based on the candidate lists and on page access patterns, hypervisors 58B and 58C perform local eviction of respective memory pages by applying de-duplication or remote swapping, as will be described below. Although the description refers mainly to hypervisor 58B, hypervisor 58C behaves similarly to hypervisor 58B.

The content of a page in the candidate list may change between the event when node 24A received/calculated the hash value and put a given page in the list, and the event when the local node receives this candidate list for eviction (including the given page). After hypervisor 58B receives a candidate list from node 24A, hypervisor 58B, at an eviction step 114, recalculates the hash values of the candidate memory pages, and excludes from eviction memory pages whose hash values (and therefore also whose contents) have changed as explained above.

In alternative embodiments, local nodes 24B and 24C apply copy-on-write protection to local memory pages. In such embodiments, when a given page changes, the hypervisor maintains the original given page unmodified, and writes the modified version of the page in a different location. By using copy-on-write, the local node does not need to check whether a given candidate page has changed as described above.

Further at step 114, hypervisor 58B decides whether to perform de-duplication, or to perform remote swapping to candidate memory pages that have not changed, according to a predefined criterion. The predefined criterion may relate, for example, to the usage or access profile of the memory pages by the VMs of node 24B. Alternatively, any other suitable criterion can be used. Following the eviction, hypervisor 58B reports to hypervisor 58A the memory pages that were actually evicted from node 24B.

At an accessing step 124, hypervisors 58B and 58C use eviction information 64A to access respective memory pages 42B and 42A that have been previously evicted. Hypervisor 58A then loops back to step 104 to re-scan memory pages of nodes 24B and 24C. Note that when accessing a given memory page that exists on another node, and for which the local node has no local copy (e.g., due to remote swapping of the given page), the local node uses eviction information 64 to locate the page and retrieve the page back (also referred to as a page-in operation).

The embodiments described above are presented by way of example, and other suitable embodiments can also be used. For example, although in the example of FIG. 2 above a single node (24A) scans the memory pages of other nodes (24B and 24C), in alternative embodiments two or more nodes may be configured to scan the memory pages of other nodes.

As another example, eviction information 64A that node 24A generates by analyzing the scanned memory pages or hash values thereof, as described above, may reside in two or more nodes and accessed using RMDA (when not available locally).

In some embodiments, when a given node, (e.g., 24B) reports to a remote node (e.g., 24A) the memory pages that were actually evicted as described at step 114 above, the given node places this report in a common memory area (e.g., in memory 36B or 36C), and node 24A accesses the report using RDMA.

In the example of FIG. 2 above, nodes 24B and 24C collect statistics of page accessing by local VMs, and use this information to decide on the eviction type (de-duplication or remote swapping). In alternative embodiments, the nodes share information regarding page accessing statistics (or any other suitable local information) with other nodes using RDMA.

Figure 3:
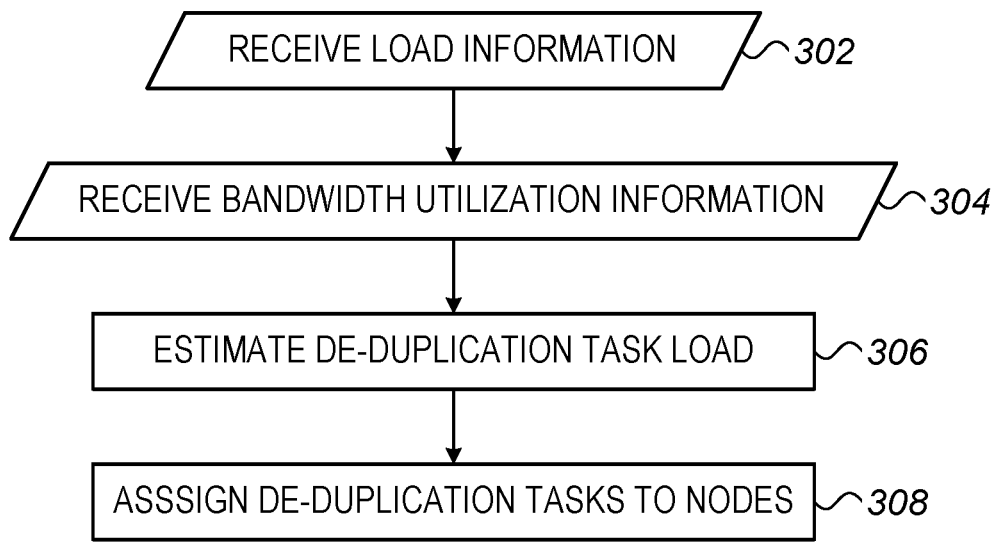
FIG. 3 is a flowchart of acts performed in de-duplication scheduling, in accordance with an embodiment of the invention.

FIG. 3 is a flowchart of acts performed by a de-duplication scheduler, in accordance with an embodiment of the invention. The de-duplication scheduler receives (302) information on the current load on some or all of the nodes 24A, 24B and 24C of the multi-node computing system 20. Alternatively or additionally, the de-duplication scheduler receives (304) information on the current bandwidth utilization of communication links between the nodes. In some embodiments of the invention, the de-duplication scheduler estimates (306) the current extent of the de-duplication task load in system 20.

Based on the received information, the de-duplication scheduler assigns (308) de-duplication tasks to the various nodes 24 of the system.

The method of FIG. 3 is optionally repeated periodically, for example at least once every hour, once every minute or once every second. Thus, the de-duplication scheduler takes advantage of free processing resources available in the nodes of the system. Optionally, the scheduling allows use of any set of one or more CPUs located in the system (e.g., servers of a rack) for de-duplication. In some cases, one of the compute nodes performs de-duplication for all the other compute nodes, or at least for all the other compute nodes for which it is determined that they are too loaded to perform the de-duplication tasks on their own. In other cases, a plurality of compute nodes are scheduled to concurrently perform de-duplication tasks for a plurality of respective other compute nodes.

Optionally, one of nodes 24 is assigned to perform the tasks of the de-duplication scheduler permanently. Alternatively, the task of the de-duplication scheduler is passed between the nodes of the system, using any suitable task scheduling method known in the art.

The assignment (308) of de-duplication tasks optionally includes determining for each node whether it currently requires de-duplication. Optionally, the determination depends on the extent of available free memory. In one embodiment, nodes having free memory above a threshold extent are determined not to require de-duplication, while nodes having an extent of free memory below the threshold are considered requiring de-duplication. In other embodiments, the determination of whether de-duplication is required depends on the time since a comprehensive de-duplication was performed on the node and a rate at which the node generates files that did not undergo de-duplication. In some embodiments, rather than determining whether a node requires de-duplication, a score representative of the extent of requiring de-duplication is calculated. The score is optionally a function of the available free memory and/or the estimated extent of files that need to undergo de-duplication.

Optionally, the assignment (308) of de-duplication tasks includes assigning each node to perform its own de-duplication as long as the load on the node is below a threshold value and assigning the de-duplication task of nodes having a load above the threshold to a node having a lowest load. In some embodiments, a cost of performing de-duplication is calculated for each pair of nodes (node1, node2), where node1 is the node for which the de-duplication is performed and node2 is the node performing the de-duplication. The cost is optionally calculated as a function of the available processing power on node2 and the available bandwidth for transmission between node1 and node2. The assignment optionally includes selecting for each node1, a node2 having a lowest cost (node1, node2). In some embodiments of the invention, the assignment is finalized on condition that the cost is lower than the corresponding score representative of the extent to which the de-duplication is required.

While in the above description each node is considered as a single unit, in some embodiments the de-duplication scheduler relates to the specific elements of the nodes, and assigns the de-duplication tasks to specific processors of the nodes. Optionally, the assignment of de-duplication tasks takes into account the different types of processors in the system and their efficiency in performing de-duplication. For example, the de-duplication may give different cost functions for performing de-duplication to central processing units (CPUs), digital signal processors (DSPs) and hardware accelerators according to their efficiency in performing the de-duplication tasks and other tasks they may perform.

In some embodiments of the invention, the de-duplication scheduler assigns all the de-duplication tasks of a single node1 to a single processor. In other embodiments, the de-duplication tasks for a single node1 may be distributed between multiple processors. For example, for each node the determination of the unit to perform the hash calculation may be separate from the unit to perform the search for duplicates. The de-duplication scheduler optionally receives the load on the CPUs and NICs of the nodes and accordingly determines whether the hash calculation is performed by the local CPU, by the local NIC or by one or more resources of one or more other nodes.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for storage, comprising:
   storing multiple memory pages in a memory of a first computer node, in a system of multiple computer nodes connected by a communication network;
   determining available processing or bandwidth resources of the system;
   scheduling a second computer node in the system to perform de-duplication tasks for the memory of the first computer node, wherein the second computer node is selected responsive to the determined available processing or bandwidth resources;
   identifying duplicate memory pages among the memory pages stored in the memory of the first computer node, by the second computer node, by directly accessing the memory of the first computer node; and
   evicting one or more of the identified duplicate memory pages from the first computer node.

2. The method according to claim 1, wherein directly accessing the memory of the first computer node comprises accessing the memory of the first computer node using a Remote Direct Memory Access (RDMA) protocol.

3. The method according to claim 1, wherein evicting the duplicate memory pages comprises de-duplicating one or more of the duplicate memory pages, or transferring one or more of the duplicate memory pages from the first computer node to another computer node.

4. The method according to claim 1, and comprising calculating respective hash values over the memory pages, wherein identifying the duplicate memory pages comprises reading the hash values directly from the memory of the first computer node and identifying the memory pages that have identical hash values.

5. The method according to claim 4, wherein calculating the hash values comprises generating the hash values using hardware in a Network Interface Card (NIC) that connects the first computer node to the communication network.

6. The method according to claim 1, wherein scheduling the second computer node comprises scheduling the second computer node when the first computer node is determined to be loaded above a threshold value.

7. The method according to claim 1, wherein scheduling the second computer node comprises scheduling a computer node currently having free available processing resources.

8. The method according to claim 1, wherein scheduling the second computer node comprises scheduling a computer node currently having most available processing resources in the system.

9. The method according to claim 1, wherein scheduling the second computer node comprises calculating a cost function of de-duplication tasks of the memory of the first node for a plurality of nodes of the system and scheduling a node with a lowest calculated score.

10. The method according to claim 9, comprising calculating a benefit score for de-duplication of the first node and scheduling a node to perform de-duplication tasks for the first node, only if the cost score of the scheduled node is lower than the benefit score.

11. The method according to claim 1, wherein scheduling the second computer node comprises scheduling the second computer node to perform de-duplication tasks for the respective memories of a plurality of the nodes.

12. The method according to claim 1, comprising scheduling a plurality of computer nodes to concurrently perform de-duplication tasks for respective memories of a plurality of other computer nodes of the system.

13. The method according to claim 1, comprising scheduling a plurality of computer nodes to perform concurrently de-duplication tasks on other nodes.

14. The method according to claim 1, and comprising maintaining accessing information to the evicted memory pages in the second computer node, and allowing the first computer node to access the evicted memory pages by reading the accessing information directly from the memory of the second computer node.

15. A multiple computer node system, comprising:
a plurality of computer nodes, which comprise one or more processing resources and a memory; and
a communication network connecting the plurality of computer nodes,
wherein the plurality of computer nodes are configured to perform de-duplication tasks on other computer nodes, over the communication network, and
wherein at least one of the computer nodes is configured to determine available processing or bandwidth resources of the computer nodes and to schedule one or more of the computer nodes to perform de-duplication tasks on the memory of the nodes, wherein the one or more of the computer nodes scheduled to perform de-duplication tasks are selected responsive to the determined available processing or bandwidth resources, such that at some times, at least one first computer node has its de-duplication performed by a second computer node, over the communication network.

16. The system according to claim 15, wherein the at least one of the computer nodes is configured to schedule a second computer node to perform de-duplication for a first computer node only when the currently available processing resources of the first computer node are below a threshold.

17. The system according to claim 15, wherein the at least one of the computer nodes is configured to schedule a second computer node, determined to have the most available processing resources among the plurality of computer nodes to perform de-duplication for the first computer node.

18. The system according to claim 15, wherein the at least one of the computer nodes is configured to calculate a cost function of de-duplication tasks of the memory of the first node for a plurality of nodes of the system and to schedule a second computer node with a lowest calculated score.

19. The system according to claim 18, wherein the at least one of the computer nodes is configured to calculate a benefit score for de-duplication of the first node and to schedule a node to perform de-duplication tasks for the first node, only if the cost score of the scheduled node is lower than the benefit score.

20. The system according to claim 18, wherein the at least one of the computer nodes is configured to repeat the scheduling at least once an hour, based on current determined available processing or bandwidth resources.

* * * * *